Figure 1:
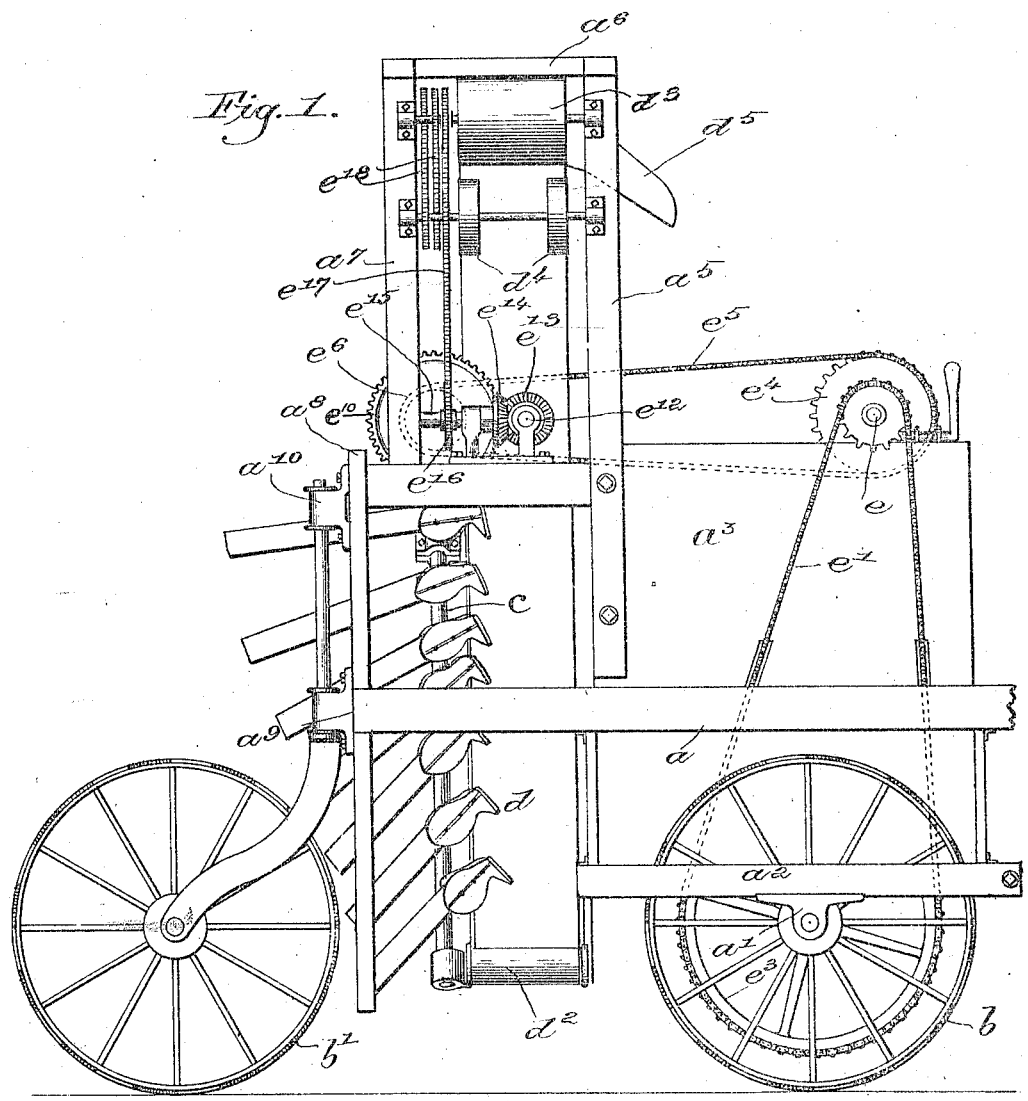

M. PRIOR.
COTTON PICKER OR HARVESTER.
APPLICATION FILED JAN. 21, 1901.

1,038,956.

Patented Sept. 17, 1912.

4 SHEETS—SHEET 1.

Witnesses.
Thomas J. Drummond
Adolph F. Kaiser

Inventor.
Matthew Prior,
by Crosby Gregory.
Atty's.

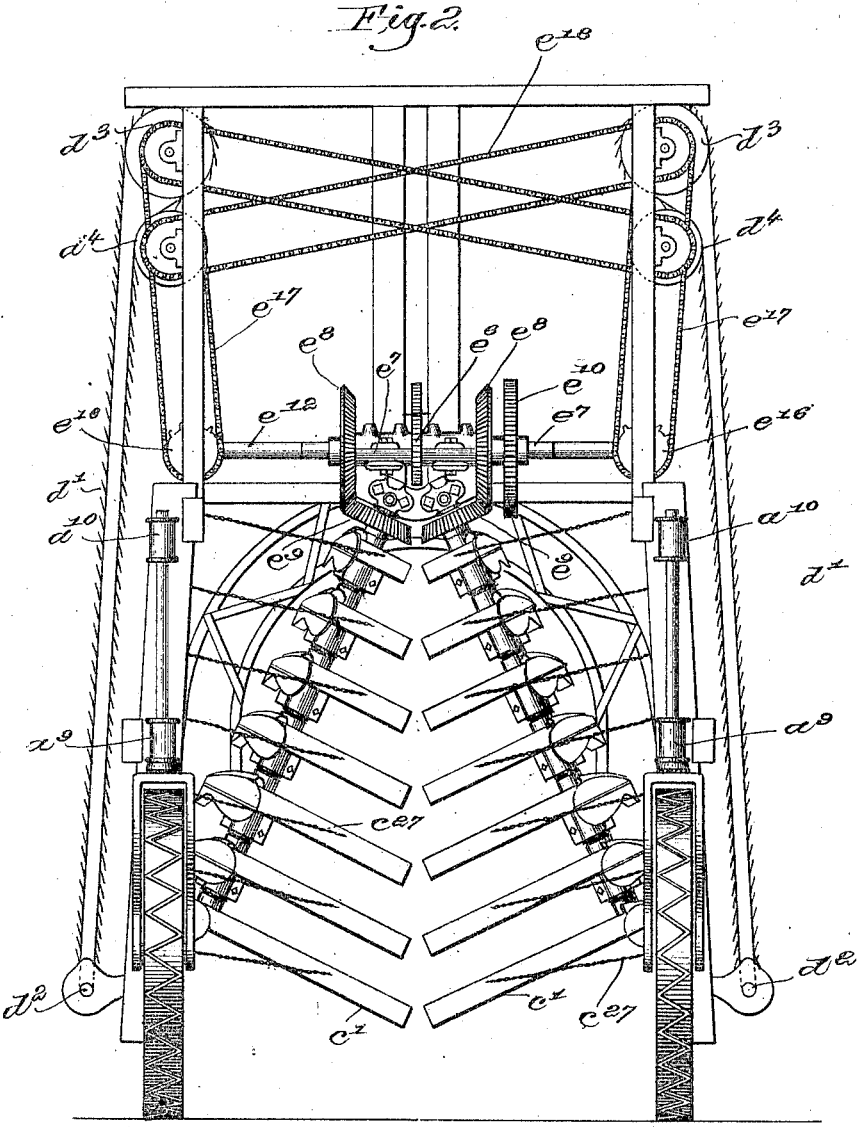

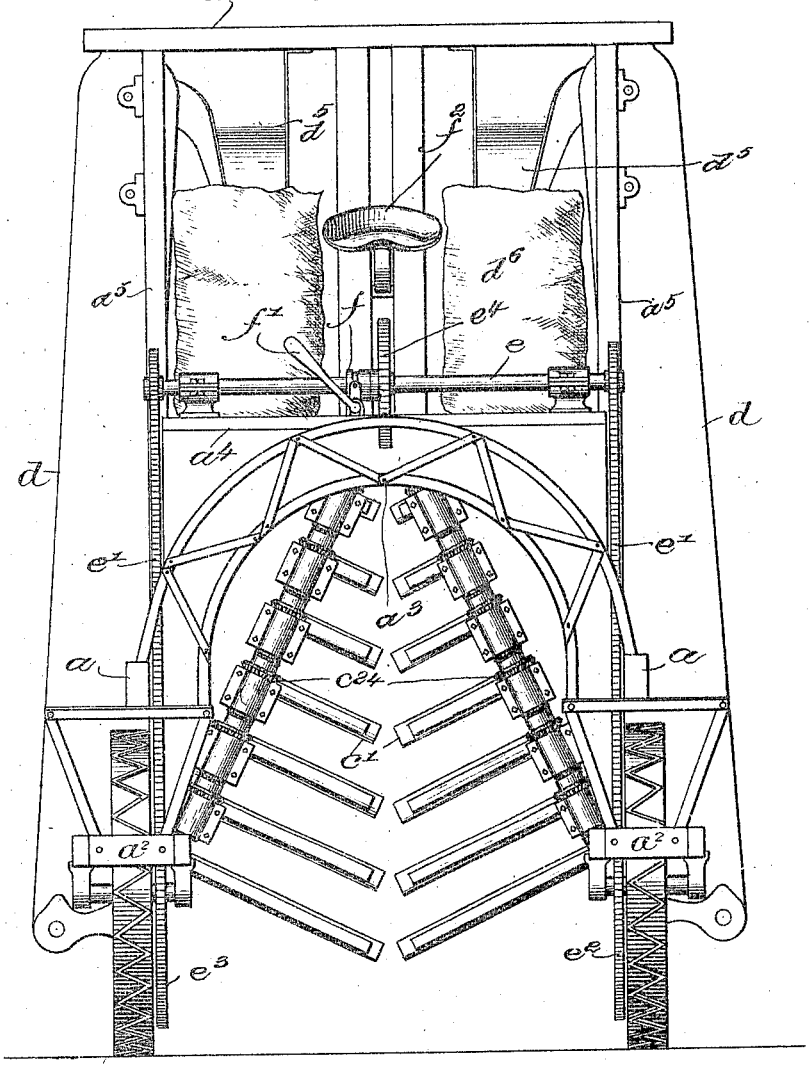

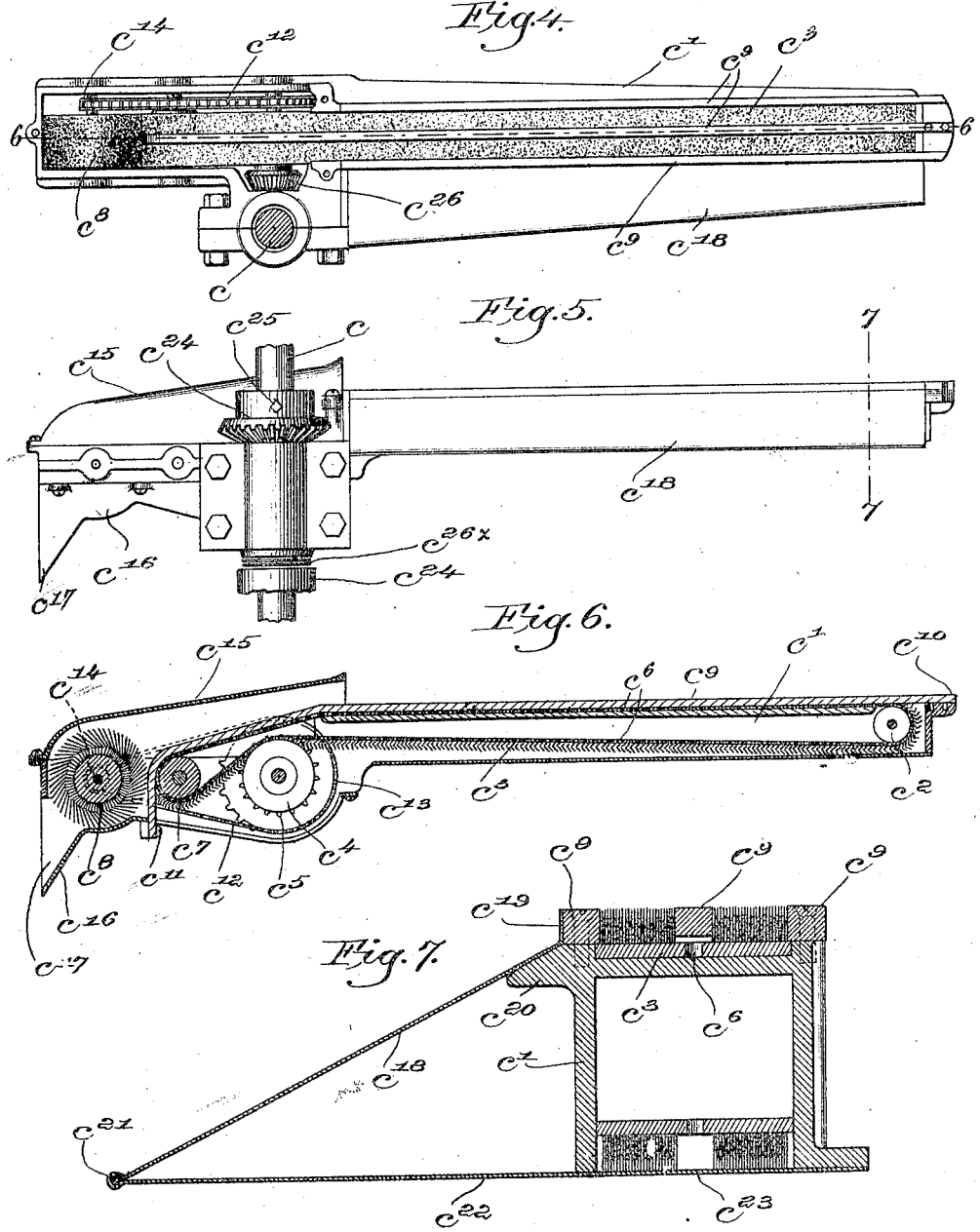

UNITED STATES PATENT OFFICE.

MATTHEW PRIOR, OF WATERTOWN, MASSACHUSETTS.

COTTON PICKER OR HARVESTER.

1,038,956.   Specification of Letters Patent.   Patented Sept. 17, 1912.

Application filed January 21, 1901. Serial No. 44,016.

*To all whom it may concern:*

Be it known that I, MATTHEW PRIOR, a citizen of the United States, residing at Watertown, county of Middlesex, State of Massachusetts, have invented an Improvement in Cotton Pickers or Harvesters, of which the following description, in connection with the accompanying drawings, is a specification, like letters on the drawings representing like parts.

Various devices have been proposed for facilitating the picking of cotton, and a few machine harvesters have been proposed, but so far as I am aware these machines have been defective in material respects, some of them injuring the plant or bush, and others picking leaves, green bolls and everything, as well as the ripe cotton, and being extremely expensive to run and keep in order, etc.

My invention aims to pick the cotton that is ripe only, and provides means for preventing the picking of the leaves and unripe cotton; the machine also including provision for gathering the cotton from a portion of the bush before the rest of the bush is attacked, thereby preventing any undue pressure on the bush which might tend to injure it or dislodge it from its proper position in the ground; means for automatically disposing of the cotton when picked, etc.

In carrying out my invention I have provided a plurality of substantially similar picking arms, each comprising preferably an endless picking belt so constructed as to grab and retain the opened fiber and pull the same from the boll if properly open; said arms being arranged one above the other to the height of the highest bush which it is intended to pick, and set at different angles so as to approach the bush dissimultaneously, and being preferably capable of yielding as may be required in case of meeting with a bush of unusual shape, or with any other obstruction together with conveying chutes and belts, and the requisite operating mechanism for keeping the parts in operation.

The constructional details of my invention will be fully pointed out in the course of the following description, reference being had to the accompanying drawings in which I have illustrated the preferred embodiment of my invention.
In the drawings, Figure 1 is a side elevation of the entire machine, the chute on the near side being omitted, for clearness; Fig. 2 is a rear end view thereof; Fig. 3 is a front end view thereof; Figs. 4 to 7 are details of one of the picking arms; Fig. 4 showing the same in top plan view, the housing being omitted; Fig. 5 showing the same in side elevation; Fig. 6 being a longitudinal vertical sectional view on the line 6—6, Fig. 4; and Fig. 7 is an enlarged cross sectional view on the line 7—7, Fig. 5.

The bed frame $a$ of the machine, traction wheels $b$, $b'$, and general construction of the machine may be of any kind desired, as the main feature of my invention resides more in the picking arms and conveying mechanism than it does in these other minor details.

As herein shown the machine is supported on four wheels, the front wheels $b$ being shown as journaled at $a'$ in a box-like end $a^2$ of a trussed arch $a^3$ extending over the machine, see Fig. 3, in position to straddle a row of cotton bushes permitting the latter to be engaged by the picking arms which are at the rear part of the machine in line with the arch, as will presently be more clearly explained.

The arch $a^3$ is at the forward end of the machine, and extends upwardly from the frame end $a^2$ and carries an upper frame $a^4$, and uprights $a^5$, the latter being connected together by cross pieces $a^6$ at the top. The pieces $a^6$ are supported at the rear by rear uprights $a^7$, mounted on a rear part $a^8$ of the frame.

The rear wheels $b'$ are shown as constructed on the caster principle, being journaled in brackets $a^9$, $a^{10}$.

I will now describe the more important part of my invention which relates more particularly to the picking arms. The machine is provided with opposite sets of these picking arms, herein shown as consisting of six each, although I do not limit myself to any given number, and in general it will be sufficient to describe one arm, inasmuch as they are all similar, except as otherwise pointed out herein. These arms are all mounted on a rotatable shaft $c$, and each arm has a body part or casting $c'$ provided at its outer end with a roller $c^2$ over which an endless belt $c^3$ passes, being driven by a sprocket $c^4$, whose pins $c^5$ engage holes $c^6$ in the belt. The belt $c^3$ passes at its inner end over a roller $c^7$, adjacent a doffer $c^8$, traveling preferably in the same direction as the belt. The picking surface of the belt is composed preferably of a multitude of small points such as are commonly found in card clothing, and the doffer is of the same general type excepting that the wires or bristle-like part thereof are longer and more flexible.

For some purposes the wires may be left with their unrestricted flexibility but usually it is preferable to fill in or embed the wires in an elastic composition, such as rubber mixed with wood pulp, so as to make a tenacious strong body, and yet permit the same to have sufficient elasticity for passing around the ends of the picker arms. By having the wires embedded so as to expose merely a very small portion of their lengths at their outer ends the cotton is caught and carried along as tenaciously as if the wires were free, and is much more easily doffed upon arrival at the inner end, the picking and carrying belt is made long lived, is practically protected from the weather, much less liable to get injured and wear out.

The belt picking surface may be of any width desired, and is provided at suitable intervals with slightly raised guards $c^9$, there being herein shown two portions of picking surface arranged between three guards, the outer two guards being herein shown as attached to the edges of the casting $c'$, and the inner guard as secured at its ends at $c^{10}$, $c^{11}$, and suspended over the middle of the belt, the wires or bristles being omitted in the path occupied by said central guard, and the several guards retaining the belt in an unvarying path of movement. As herein shown the driving holes of the belt are beneath the central guard $c^9$. I consider this feature of my invention of the utmost importance, inasmuch as it insures that the leaves, twigs, etc., which strike the picker arm will simply slide harmlessly over the guards and off from the picker arms, whereas the fine fibers of the cotton proper will be caught by the prick-like ends of the belt $c^3$ and held tenaciously, it being observed, by viewing Fig. 6, that these ends all project forward in the direction of the travel of the belt, or over toward the left, Fig. 6 when on the upper portion of the belt, this being preferable in order to hold the cotton more tenaciously than otherwise, and also to permit the same to be readily doffed when it arrives at the inner end of the arm.

The doffer is driven over toward the right, Fig. 6 by a sprocket chain $c^{12}$ from a sprocket wheel $c^{13}$, on the shaft of the sprocket $c^4$, passing over a sprocket $c^{14}$ on the doffer shaft.

The inner end of the picker arm is inclosed on its upper side by a housing $c^{15}$, and on its lower side by a peculiar casting $c^{16}$, secured on the underside of the picker-arm, and having a discharge mouth $c^{17}$ at its lower end below the doffer for discharging the picked cotton into a main chute $d$ into which the cotton falls from the respective picker-arms. At its lower end the chute $d$ has an endless belt carrier $d'$, journaled at $d^2$ in the bottom of the chute, and passing at its upper end over a drum $d^3$ and guide wheels $d^4$ mounted in the top frame of the machine.

Secured to the front side of each picker arm is a separator $c^{18}$, herein shown as made of sheet metal, secured at $c^{19}$ to the upper front edge of the casting $c'$, which has a rib $c^{20}$ for supporting and giving rigidity to said separator, the latter extended downward obliquely and being provided with a beaded edge $c^{21}$, which, not only, renders the device stiff but gives bluntness so as to prevent cutting or tearing of the bushes, the sheet metal of the separator passing thence, at $c^{22}$, to the lower front edge of the body $c'$ and preferably extending rearwardly to the back edge thereof beneath the endless belt to constitute a bottom $c^{23}$ for the picker arm, sheltering the belt and preventing the same from accidentally operating. The purpose of this separator is to enter between the branches of the cotton bush and render it easy for the machine to obtain access to all parts of the bushes irrespective of their particular shape and kind.

The various arms are arranged one above the other on the shaft $c$, which is provided with separate driving gears $c^{24}$, secured to the shaft by screw bolts $c^{25}$ and also preferably splined in position, said gears meshing with gears $c^{26}$ on the shaft of the sprocket wheels $c^4$; the picker arms being supported by ball bearings $c^{26x}$ of any suitable kind and free to swing independently of each other on the shaft $c$.

Viewing Figs. 2 and 3 it will be seen that the shaft $c$ extends downwardly obliquely, and because of this angular position of the shafts and the independent freedom of the picker-arms, the latter tend by gravity to swing downwardly. Each picker-arm is held from swinging to its lowest position by a chain $c^{27}$, the successive chains being arranged to hold the respective picker-arms farther and farther away, permitting the opposite pairs of arms to swing merely to a meeting point at the center, the result being that the uppermost arms are farther away from the bushes than the lowermost arms, viewing Figs. 1 and 2, so that the lower arms meet the bushes first and pick the cotton and afterward the upper arms come in contact with the top of the bushes and perform their work. Because of this construction the arms tend to swing forwardly toward the cotton bushes, being at the same time free to be swung rearwardly by contact with said bushes whenever the latter offer any more than usual resistance. This feature of my invention is of considerable importance as it prevents any possibility of undue injury to the bushes.

The separator $c^{18}$ enters gently without any possibility of tearing the bushes, and because of its smooth surface it simply separates the twigs and leaves, and its general incline coöperates with the inclination of the plants to give perfect freedom and facility of movement and guides the cotton to the picker surface.

The moment that the opened bolls approach the endless belt the protruding cotton is instantly caught by the belt and pulled out of the boll and carried along to the doffer, while the leaves, branches and bolls themselves slide harmlessly over the guards of the picker-arms.

If, by accident, a boll should get broken off and the cotton should cling both to it and to the belt, thereby carrying the boll along the latter would be separated from the cotton by coming into contact with the outer end of the housing $c^{15}$ and would fall by gravity away from the picker-arm leaving the cotton to be carried along inside of the housing and removed by the doffer.

Not only are the cotton picking-arms usually held by force of gravity toward the center or toward their lowermost position, but the driving mechanism tends to maintain them in that position.

The general operating mechanism of the machine may be of any preferred kind, the power being herein shown as derived from the front traction wheels, although any other suitable power may be used.

A shaft $e$ is mounted above the arch $a^3$ and driven by sprocket chains $e'$ and sprocket wheels $e^2$, $e^3$, from the front traction wheels. The shaft $e$ is provided with a driving sprocket $e^4$, over which passes a chain $e^5$ to a central sprocket $e^6$ on a shaft $e^7$, shown as journaled near the rear of the machine. The shaft $e^7$ is provided with opposite bevel gears $e^8$ in mesh with gears $e^9$ on the upper ends of the shafts $c$, and is also provided with a gear $e^{10}$ in mesh with a gear on the shaft $e^{12}$, provided at its ends with bevel gears $e^{13}$ in mesh with corresponding gears $e^{14}$ on stop shafts $e^{15}$, carrying sprocket wheels $e^{16}$ over which run chains $e^{17}$ to operate the drums $d^3$ already described, and preferably also from the latter belts or sprocket chains $e^{18}$ pass to the opposite guide wheels so as to positively drive the latter and thereby assist in driving the belt carriers $d'$ at the opposite sides of the machine.

The cotton having been picked in the manner already fully described, is delivered by the carrier $d'$ at the opposite sides of the machine and falls into a chute $d^5$ from which it drops into suitable removable receptacles, ordinary cotton bags being shown in Fig. 3 resting over the front of the machine.

It will be understood that the apparatus will be drawn by horses, mules or other power.

It will also be understood that the machine is provided with a suitable clutch $f$ and operating handle $f'$ for throwing the cotton picking mechanism of the machine into and out of action as the driver may require, the latter being mounted on a suitable seat $f^2$.

It will be understood that I do not limit myself to the mechanism herein shown as many changes in the form and arrangement of the various parts may be resorted to without departing from the spirit and scope of my invention.

Having described my invention what I claim as new and desire to secure by Letters Patent is:—

1. A cotton picker, having a long slender freely projecting arm constructed and arranged to enter freely far within a bush, having a cotton-picking surface composed of a multitude of fine wires set on end parallel and closely together and having their cotton-gripping ends arranged to project so that, on the side which faces the forward direction of travel of the picker, said ends extend transversely outward from the arm with their free ends pointing in a direction slightly away from the free end of the arm and toward the opposite end of the arm.

2. A cotton picker, having a long slender arm supported at one end only and at its opposite end capable of entering freely within the bushes, a support for said arm, said arm having a cotton-picking surface composed of a multitude of fine wires standing endwise from said arm, parallel and closely together, said wires, at the bush-engaging side of the arm, projecting at their free ends toward the supported end of the arm at an acute angle, said arm being yieldingly mounted, rendering it free to swing on its support when abnormally opposed by a bush.

3. A cotton picker, having a slender arm for entering at its free end within the bushes, said arm being provided with a cotton-picking surface composed of a multitude of fine wires set on end parallel and closely together and, at the front side where the arm engages the bushes as the cotton picker moves forward, arranged to project transversely at their free ends away from the free end of the arm at an obtuse angle for presentation laterally to the bush, combined with an endless belt carrier for receiving the picked cotton from the inner end of said arm.

4. A cotton picker, having a slender arm for entrance within a bush, having a picking surface extending lengthwise of one side thereof, composed of a multitude of closely arranged, fine parallel, hair-like, cotton grabbing points or teeth, and longitudinal protecting guards at and close to the opposite sides of said surface extending very nearly level with said picking surface, projecting only slightly beyond the latter for preventing said teeth from catching branches and leaves while permitting said teeth to catch the ripe cotton.

5. A cotton picker, having a slender arm for entrance within a bush, having a level picking surface extending lengthwise of one side thereof, composed of a multitude of closely packed, fine, hair-like, cotton grabbing points or teeth, and longitudinal protecting guards at the opposite sides of said surface extending very nearly flat with the level picking surface and only very slightly beyond the latter for preventing said teeth from catching branches and leaves while yet permitting said teeth to freely and unrestrictedly catch the ripe cotton, said arm being mounted for free movement within the bush.

6. A cotton picker, having a slender arm for entrance within a bush, having a picking surface extending lengthwise of one side thereof, composed of a multitude of closely arranged, tightly packed, fine, hair-like teeth, standing obliquely, with their outer ends projecting on the front side of the arm toward the machine, and longitudinal protecting guards close to the opposite sides of said surface and very nearly level with said surface projecting only slightly beyond the latter for preventing said teeth from catching branches and leaves while permitting said tightly packed teeth to catch the ripe cotton.

7. A cotton picker, having a slender arm adapted to enter within a bush, and an endless belt having a picking surface extending lengthwise of one side of said arm, composed of a multitude of closely arranged, fine, hair-like cotton-grabbing points or teeth, said arm having longitudinal protecting guards at the opposite sides of said surface extending approximately level with said picking surface for preventing said teeth from catching branches and leaves while permitting said teeth to catch the ripe cotton.

8. A cotton-picker in the shape of a long thin arm for entering within a bush, an endless belt mounted to move longitudinally of said arm, means for driving said belt in one direction only, said belt being provided lengthwise with a cotton picking surface having a multitude of cotton grabbing points or teeth, and protecting guards, said picking surface being arranged in narrow strips separated by the guards, the latter being separated by narrow spaces for causing leaves and twigs to bridge across the same and escape the picking surface between the guards.

9. A cotton-picker, having a long thin arm for entering within a bush, said arm normally projecting outwardly in a relatively fixed picking position, but being free to swing when abnormally obstructed, said arm being provided along its front edge with deflecting means for enabling it to separate and readily enter a cotton bush for obtaining access to the cotton, said arm carrying a picking surface movable longitudinally thereof and provided with a multitude of cotton grabbing points or teeth exposed at one side of said deflecting means, protecting guards restricting the exposed portion of said picking surface to a narrow strip over which leaves, etc., may pass without contact with the picking surface, and means for moving said picking surface longitudinally along the arm.

10. A cotton picker, having an arm, an upright shaft for said arm standing out of a vertical position, the arm extending permanently from said shaft and carrying a picking surface movable on the front side when approaching the bush longitudinally of the arm in a direction away from the free ends of the arm and provided with a multitude of fine, closely arranged, cotton-grabbing points or teeth, protecting guards projecting to a very small extent beyond and almost level with, the latter, and means for moving said picking surface longitudinally along the arm, said arm being mounted free to swing automatically for yielding when abnormally opposed by a bush, and swinging by gravity back to normal working position.

11. A cotton-picker, having a plurality of picker-arms in a series one above another and each normally standing slightly in rear of the next one below, said arms normally projecting in a fixed picking position, but being capable of yielding independently to abnormal obstructions, and each containing cotton picking mechanism consisting of a surface composed of fine, closely arranged cotton grabbing points, and means for continuously moving said surface longitudinally of said arms for picking the cotton and carrying it away from the free end of the arm.

12. A cotton picker, having a plurality of picker arms mounted in a permanently up-and-down series and each arm extending outwardly normally slightly in rear of those below, said arms being capable of yielding independently to abnormal obstructions, each containing cotton picking mechanism, and means for causing said respective picker arms to meet a bush out of vertical longitudinal alinement with each other.

13. A cotton picker having two series of picker-arms arranged opposite each other, said arms being freely pivoted to swing toward each other, and converging downward and toward each other at their free inner ends, each arm being provided with a movable picking surface, and means to move said picking surface for picking and conveying the cotton from the bush.

14. A cotton picker having two series of freely swinging picker-arms arranged opposite each other and converging toward each other at their free inner ends, each arm being provided with a longitudinally movable picking surface composed of a multitude of fine, close teeth, protecting guards restricting the exposed portion of said picking surface to a narrow, level strip, said guards being approximately level with the substantially continuous surface of fine cotton-grabbing points, being very slightly raised to cause leaves, etc., to pass without contact with the picking surface, and means for moving said picking surface for picking and conveying the cotton from the bush, said machine having an arch-like construction for passing over the bushes, and said series of picker-arms being mounted at the opposite sides of the machine to swing toward each other and approximately together for engaging a bush as the machine is driven over the same.

15. A cotton-picker having a series of picker-arms each provided with cotton picking mechanism, a shaft on which said arms are pivoted, the arms swinging freely downward and forward, and said shaft standing at an oblique angle therefor.

16. A cotton-picker having a series of picker arms, each provided with cotton picking mechanism, a shaft pivotally supporting said arms, the arms tending to swing downward and forward, said shaft standing at an oblique angle therefor, mechanism for rotating said shaft, and means carried by said shaft and operated by the rotation thereof for operating said cotton picking mechanisms.

17. A cotton-picker having a series of picker-arms extending out permanently in position for individually engaging a bush, said arms normally occupying successively different vertical planes, and being free to move by gravity toward and from said planes, separate cotton doffing means for each arm, and a chute to receive the cotton from the doffers.

In testimony whereof, I have signed my name to this specification, in the presence of two subscribing witnesses.

MATTHEW PRIOR.

Witnesses:
 GEO. H. MAXWELL,
 GEO. W. GREGORY.